US012734094B2

(12) United States Patent
Younger

(10) Patent No.: US 12,734,094 B2
(45) Date of Patent: Sep. 15, 2026

(54) ROLLATOR

(71) Applicant: Medical Depot, Inc., Port Washington, NY (US)

(72) Inventor: Max Jefferies Younger, Roeland Park, KS (US)

(73) Assignee: Medical Depot, Inc., Port Washington, NY (US)

( * ) Notice: Subject to any disclaimer, the term of this patent is extended or adjusted under 35 U.S.C. 154(b) by 258 days.

(21) Appl. No.: 18/679,118

(22) Filed: May 30, 2024

(65) Prior Publication Data

US 2024/0398653 A1 Dec. 5, 2024

Related U.S. Application Data

(60) Provisional application No. 63/505,353, filed on May 31, 2023.

(51) Int. Cl.
*A61H 3/04* (2006.01)
*B62B 3/02* (2006.01)

(52) U.S. Cl.
CPC ................. *A61H 3/04* (2013.01); *B62B 3/02* (2013.01); *A61H 2201/1633* (2013.01); *A61H 2201/1635* (2013.01)

(58) Field of Classification Search
CPC .............. A61H 3/04; A61H 2201/1633; A61H 2201/1635; B62B 3/02; B62B 3/007; B62B 3/025; B62B 3/027
See application file for complete search history.

(56) References Cited

U.S. PATENT DOCUMENTS

| | | | | |
|---|---|---|---|---|
| 5,558,358 | A * | 9/1996 | Johnson | A61G 5/0891 280/87.021 |
| 9,173,802 | B2 * | 11/2015 | Willis | A61G 5/08 |
| 10,772,788 | B2 * | 9/2020 | Kapec | A61H 3/04 |
| 2021/0228433 | A1 * | 7/2021 | Landry | A61B 5/1117 |
| 2024/0299232 | A1 * | 9/2024 | Knopow | A61H 3/04 |

FOREIGN PATENT DOCUMENTS

WO WO-2006118756 A2 * 11/2006 ............... A61H 3/04

OTHER PUBLICATIONS

Written Opinion of the International Searching Authority, Sep. 3, 2024, PCT/2024/031716.

* cited by examiner

*Primary Examiner* — John D Walters
(74) *Attorney, Agent, or Firm* — Bradley J. Shelowitz

(57) ABSTRACT

A rollator includes first and second upright frames supported on respective first and second wheeled leg assemblies. The first and second leg assemblies are configured to fold inwardly toward one another, and front and rear legs of each leg assembly are configured to fold upwardly to transition the rollator into a compact state, making the rollator easy for transport or storage when not in use.

20 Claims, 9 Drawing Sheets

114
105
116
115
107
124
110
102
102b
146
138
140
130
144
122

106
122a
122
130
107
118
120
108
112
132
112b
131
124

ROLLATOR

CROSS-REFERENCE TO RELATED APPLICATION

The present application claims the benefit of and priority to U.S. Provisional Patent Application No. 63/505,353, filed on May 31, 2023, the entire contents of which being incorporated by reference herein.

BACKGROUND

The present disclosure relates to mobility aids, and more particularly, to rollators. Rollators facilitate an individual's ability to walk and be independently mobile by providing stabilization, support, and/or reducing the burden on the individual's lower body. A typical rollator includes a frame supported on three to four wheels, handlebars, and a seat. There is a continuing need for improving the usability, foldability, transportability, and/or convenience of use of rollators.

SUMMARY

In accordance with an aspect of the present disclosure, a rollator for aiding mobility of a user is provided and includes first and second upright frames, a seat positioned between the first and second upright frames, first and second leg assemblies coupled to the respective first and second upright frames, and a hinge mechanism coupled with the first upright frame and the first leg assembly. The first leg assembly includes a front leg supporting a first front wheel, and a rear leg supporting a first rear wheel. The first leg assembly is configured to pivot relative to the first upright frame about a first axis. The front leg and/or the rear leg is configured to pivot about a second axis that is different from the first axis.

In aspects, the first axis and the second axis may be perpendicular to one another.

In aspects, the first leg assembly may be configured to pivot as a unit inwardly relative to the first upright frame, and the front leg and the rear leg may be configured to rotate toward one another.

In aspects, the first leg assembly may be configured to pivot as a unit about the first axis between a first position and a second position. In the first position, the front leg may extend forwardly of the first upright frame and the rear leg may extend rearwardly of the first upright frame. In the second position, the first leg assembly may be positioned between the first upright frame and the second upright frame.

In aspects, the front leg and the rear leg may be configured to pivot relative to one another.

In aspects, a single actuation of the hinge mechanism may both unlock the first leg assembly from the first upright frame and unlock the front and rear legs to allow for movement of the front and rear legs relative to one another.

In aspects, the second leg assembly may include a front leg and a rear leg. The first and second leg assemblies may be configured to transition between an in-use state and a folded state. In the folded state, the rear legs of the first and second leg assemblies may be positioned on a first side of the seat, and the front legs of the first and second leg assemblies may be positioned on a second, opposite side of the seat.

In aspects, the seat may be configured to move relative to the first and second upright frames between a horizontally-oriented position and a vertically-oriented position. In the horizontally-oriented position, the seat may be perpendicular to the first and second upright frames. In the vertically-oriented position, the seat may be parallel with the first and second upright frames.

In aspects, the front leg of the second leg assembly may support a second front wheel and the rear leg of the second leg assembly may support a second rear wheel. The first and second front wheels may be pivotably attached to the respective front legs by a respective swivel joint.

In aspects, the rollator may further include a first handlebar extending from the first upright frame and configured to rotate about a longitudinal axis of the first upright frame.

In aspects, the hinge mechanism may include a latch having a first end portion pivotably coupled to the first upright frame, and a second end portion configured to selectively lock the first leg assembly to the first upright frame to prevent pivoting of the first leg assembly about the first axis.

In aspects, the hinge mechanism may include an actuator operably coupled to the latch such that an actuation of the actuator rotates the latch from a locking configuration with the first leg assembly and an unlocking configuration with the first leg assembly.

In aspects, the rollator may further include a hinge plate pivotably coupled to the first upright frame. Each of the front leg and the rear leg may be pivotably coupled to the hinge plate such that the first leg assembly is configured to pivot relative to the first upright frame as a unit with the hinge plate and the front and rear legs may be configured to pivot relative to the hinge plate.

In aspects, the latch may be movable between a locked configuration and an unlocked configuration. In the locked configuration, the latch may prevent the hinge plate from rotating relative to the first upright frame and may prevent the front and rear legs from rotating relative to the hinge plate. In the unlocked configuration, the hinge plate may be free to rotate relative to the first upright frame and the front and rear legs may be free to rotate relative to the hinge plate.

In aspects, the hinge mechanism may define a recess and the second end portion of the latch may have a hooked feature configured for detachable receipt in the recess.

In accordance with another aspect of the present disclosure, a mobility aid is provided that includes a first upright frame, a second upright frame spaced laterally from the first upright frame, a seat movably supported between the first upright frame and the second upright frame, a first leg assembly coupled to the first upright frame, a second leg assembly coupled to the second upright frame, a first hinge mechanism coupled with the first upright frame and the first leg assembly, and a second hinge mechanism coupled with the second upright frame and the second leg assembly. The first leg assembly includes a front leg supporting a first front wheel, and a rear leg supporting a first rear wheel. The second leg assembly includes a front leg supporting a second front wheel, and a rear leg supporting a second rear wheel. The first and second leg assemblies are configured to fold, via the first and second hinge assemblies, inwardly toward one another to a position between the first and second upright frames. The front and rear legs of the first leg assembly are configured to fold toward one another, and the front and rear legs of the second leg assembly are configured to fold toward one another.

In aspects, the first hinge mechanism may include a latch and an actuator. The latch may have a first end portion pivotably coupled to the first upright frame, and a second end portion configured to selectively lock the first leg assembly to the first upright frame. The actuator may be operably coupled to the latch such that a single actuation of the actuator rotates the latch from a locking configuration with the first leg assembly to an unlocking configuration with the first leg assembly.

In aspects, the mobility aid may further include a hinge plate pivotably coupled to the first upright frame. The front and rear legs of the first leg assembly may be pivotably coupled to the hinge plate such that the first leg assembly is configured to pivot relative to the first upright frame as a unit with the hinge plate and the front and rear legs are configured to pivot relative to the hinge plate.

In aspects, the latch may be movable between a locked configuration and an unlocked configuration. In the locked configuration, the latch may prevent the hinge plate from pivoting relative to the first upright frame and may prevent the front and rear legs of the first leg assembly from rotating relative to the hinge plate. In the unlocked configuration, the hinge plate may be free to rotate relative to the first upright frame and the front and rear legs of the first leg assembly may be free to rotate relative to the hinge plate.

In accordance with another aspect of the present disclosure, a rollator is provided that includes a first upright frame, a second upright frame spaced laterally from the first upright frame, a seat supported between the first upright frame and the second upright frame, first and second leg assemblies coupled to the respective first and second upright frames, a first hinge mechanism coupled with the first upright frame and the first leg assembly, and a second hinge mechanism coupled with the second upright frame and the second leg assembly. The seat is configured to pivot between a horizontally-oriented position and a vertically-oriented position. The first leg assembly includes a front leg supporting a first front wheel, and a rear leg supporting a first rear wheel. The second leg assembly includes a front leg supporting a second front wheel, and a rear leg supporting a second rear wheel. The first and second leg assemblies are configured to fold, via the first and second hinge assemblies, inwardly toward one another to a position between the first and second upright frames. The front and rear legs of the first leg assembly are configured to fold toward one another, and the front and rear legs of the second leg assembly are configured to fold toward one another such that when the seat is in the vertically-oriented position, the rear legs of the first and second leg assemblies are positioned on a first side of the seat and the front legs of the first and second leg assemblies are positioned on a second, opposite side of the seat.

As used herein, the terms parallel and perpendicular are understood to include relative configurations that are substantially parallel and substantially perpendicular up to about + or −15 degrees from true parallel and true perpendicular.

As used herein, the term "about" means that the numerical value is approximate and small variations would not significantly affect the practice of the disclosed embodiments. Where a numerical limitation is used, unless indicated otherwise by the context, "about" means the numerical value can vary by +10% and remain within the scope of the disclosed embodiments.

BRIEF DESCRIPTION OF THE DRAWINGS

Embodiments of the present disclosure are described herein with reference to the accompanying drawings, wherein.

DETAILED DESCRIPTION

Figure 1:
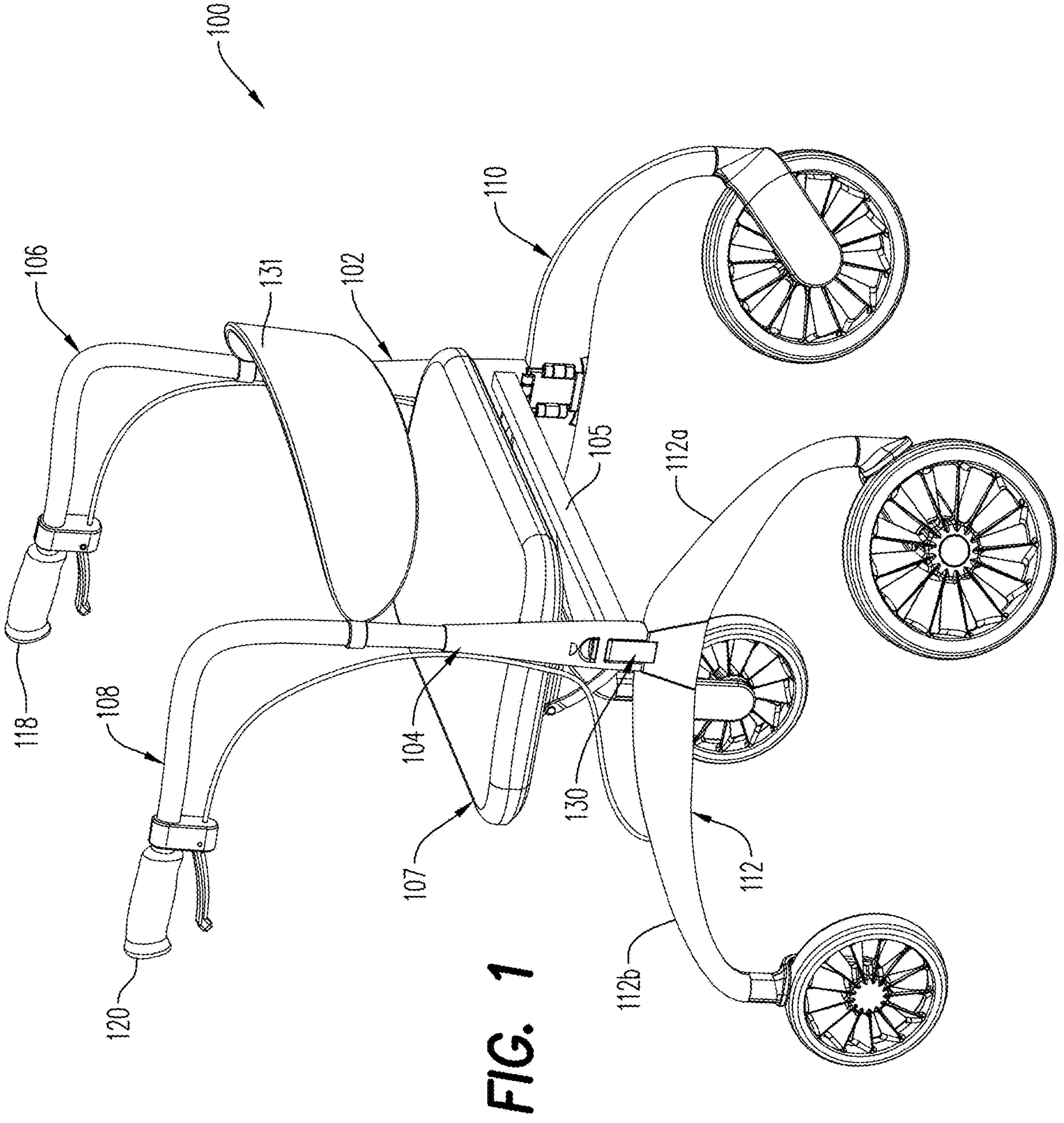
FIG. 1 is a front perspective view illustrating an exemplary embodiment of a rollator shown in an in-use or operational configuration.
Figure 2:
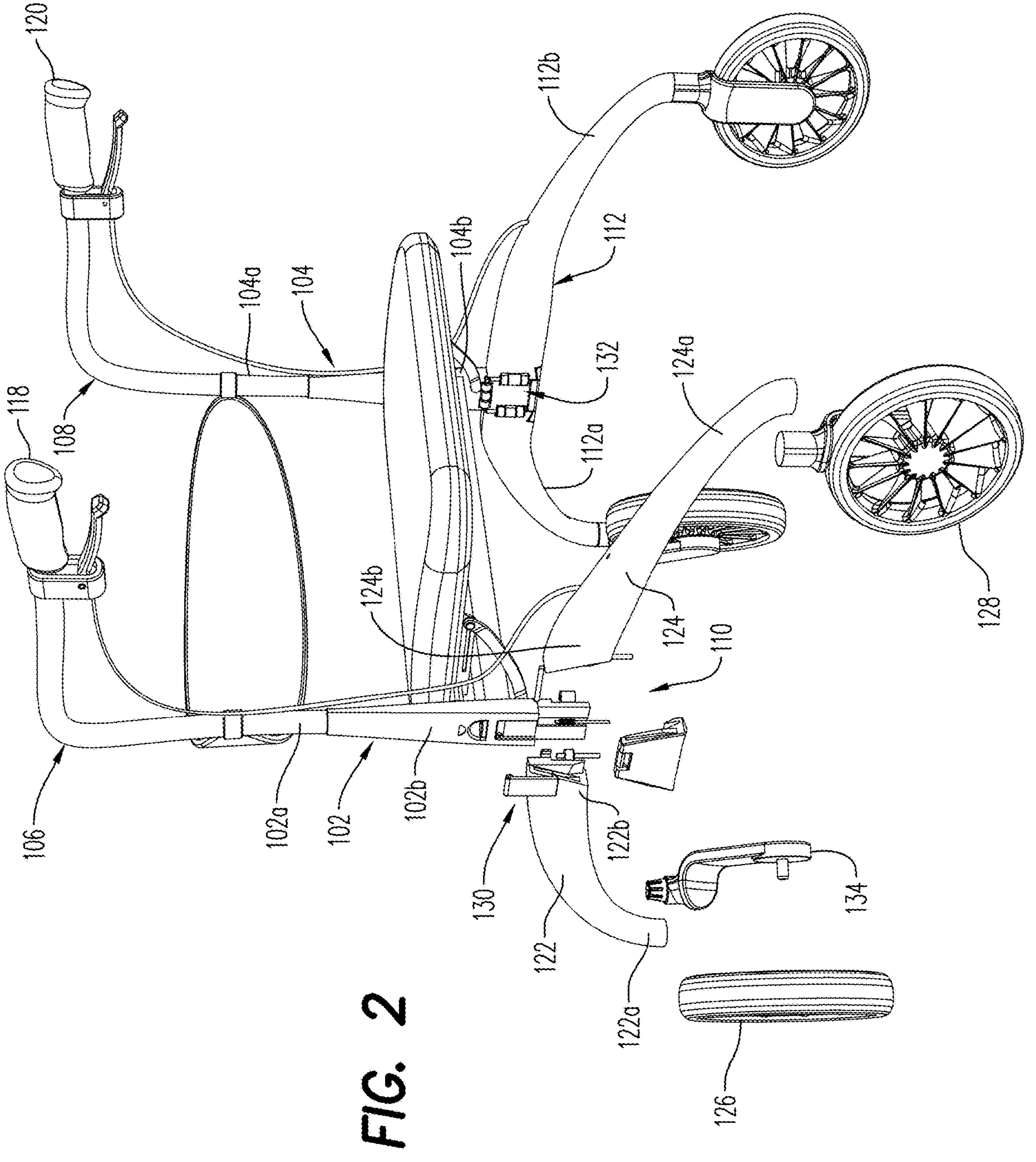
FIG. 2 is a rear perspective view, with parts of a hinge mechanism separated, of the rollator of FIG. 1.

Embodiments of the presently disclosed rollators are described in detail with reference to the drawings, in which like reference numerals designate identical or corresponding elements in each of the several views.

With reference to FIGS. 1-9B, an exemplary embodiment of a mobility aid, such as, for example, a rollator, is illustrated and is generally designated 100. As will be described in further detail herein, the rollator 100 is configured to transition between an in-use or expanded configuration (FIG. 1), and a folded or stored configuration (FIGS. 9A-9B), in which the rollator 100 assumes a significantly reduced footprint comparable in shape to a briefcase to make storage and transport of the rollator 100 easier for a user.

The rollator 100 generally includes a first stanchion or upright frame 102, a second stanchion or upright frame 104 coupled to the left upright frame 102 by a crossbar 105, first and second shafts or handlebars 106, 108 telescopically supported by the respective first and second upright frames 102, 104, a foldable seat 107 pivotably supported between the first and second upright frames 102, 104, and first and second leg assemblies 110, 112 movably supporting the first and second upright frames 102, 104 on a ground surface. In aspects, the first and second upright frames 102, 104 may be coupled to one another by a folding mechanism (not explicitly shown) permitting the first and second upright frames 102, 104 to laterally collapse and expand toward one another.

Figure 3:
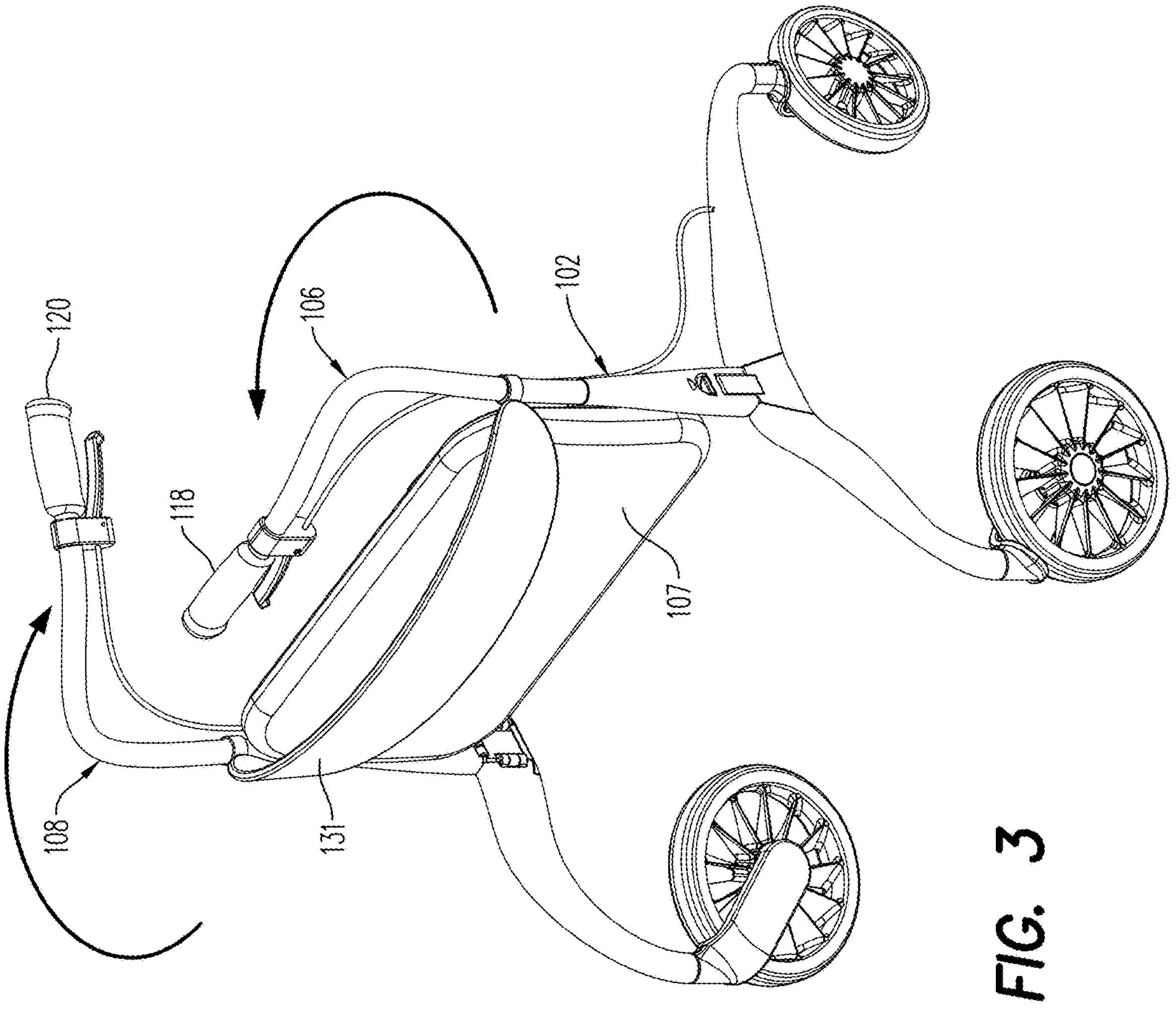
FIG. 3 is a front perspective view of the rollator of FIG. 1, with a seat and handlebars thereof in a folded or semi-folded configuration.
Figure 4:
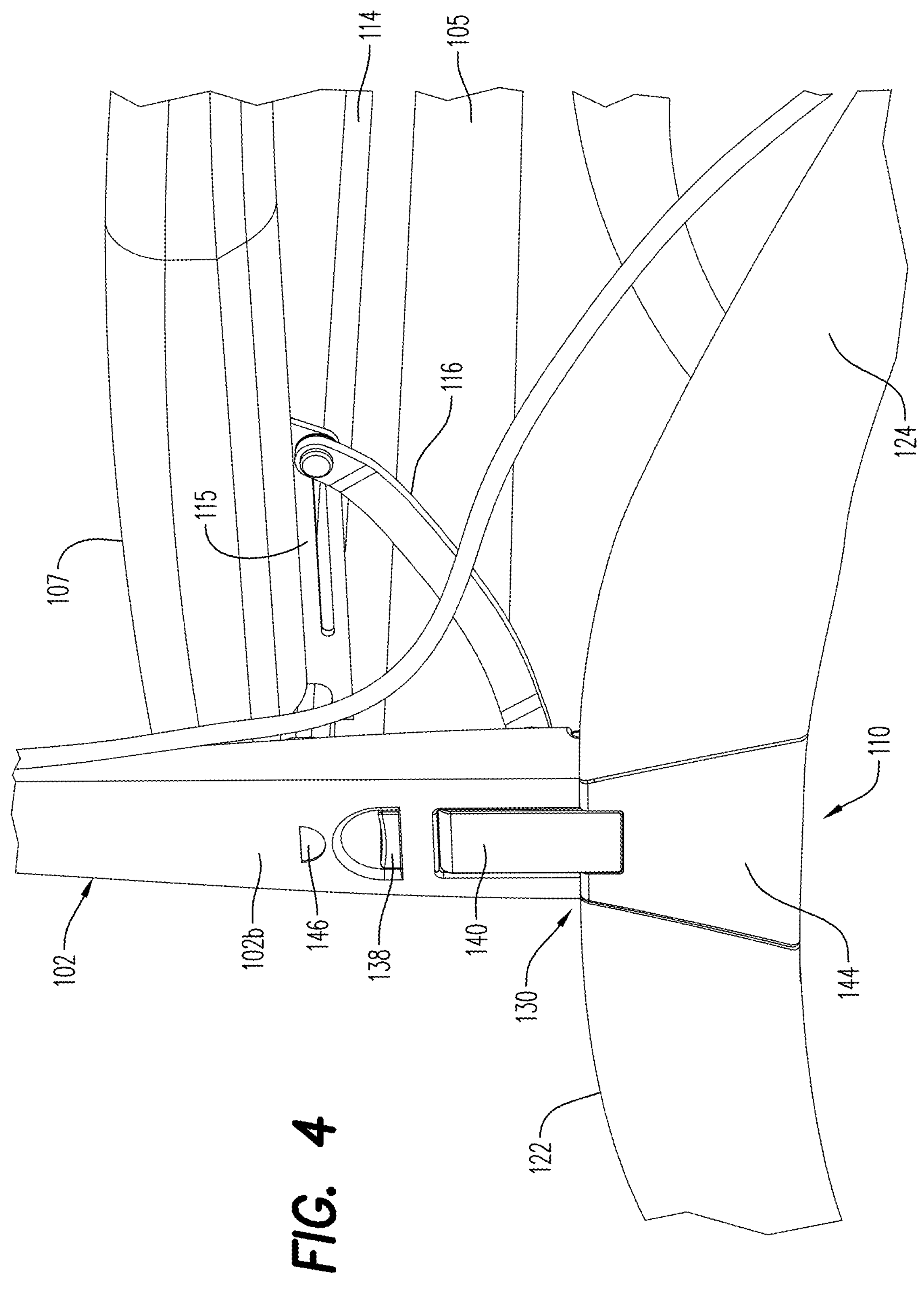
FIG. 4 is an enlarged, side perspective view illustrating the hinge mechanism of FIG. 2.
Figure 5:
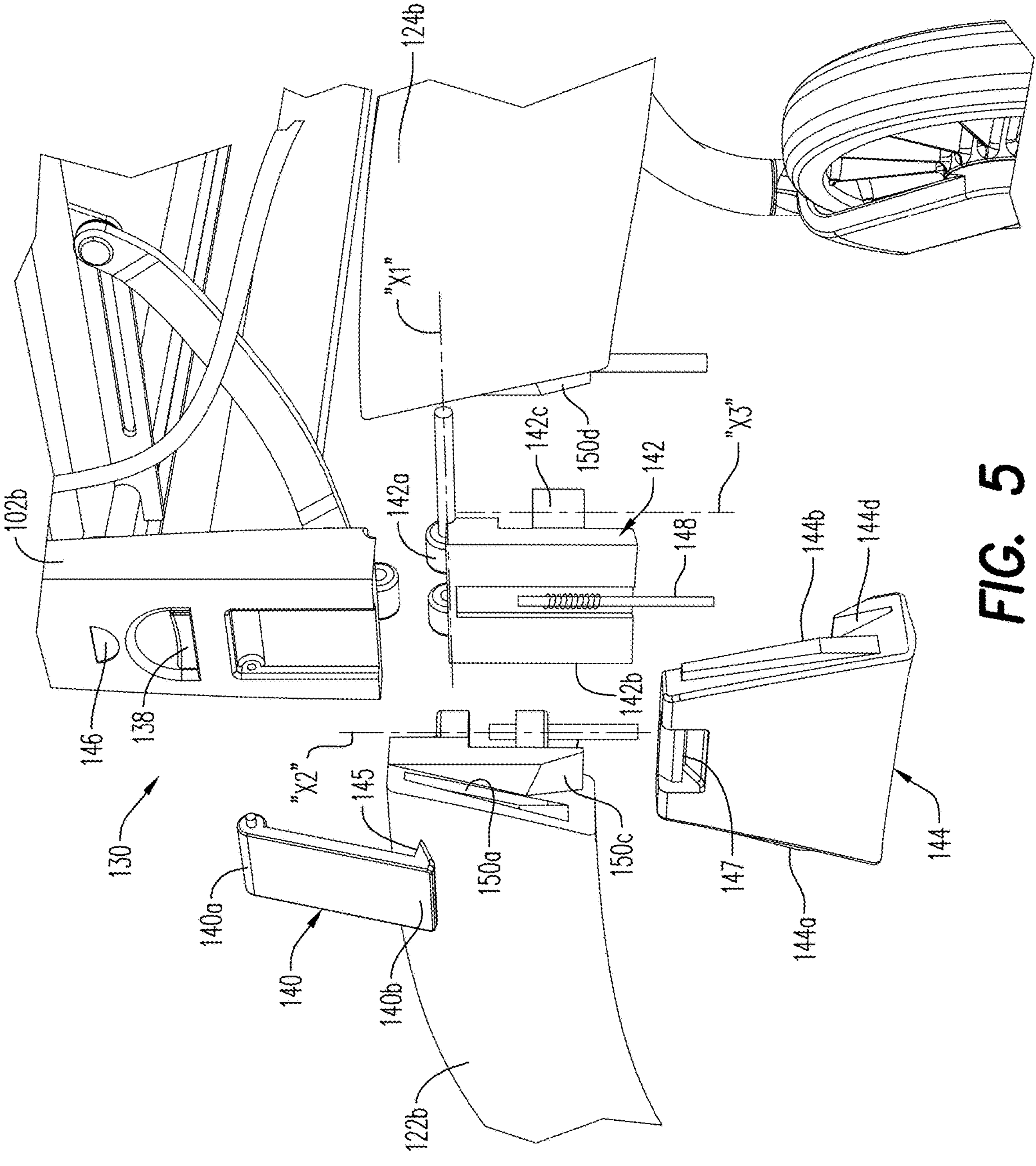
FIG. 5 is a perspective view, with parts separated, of the hinge mechanism of FIG. 4.
Figure 6:
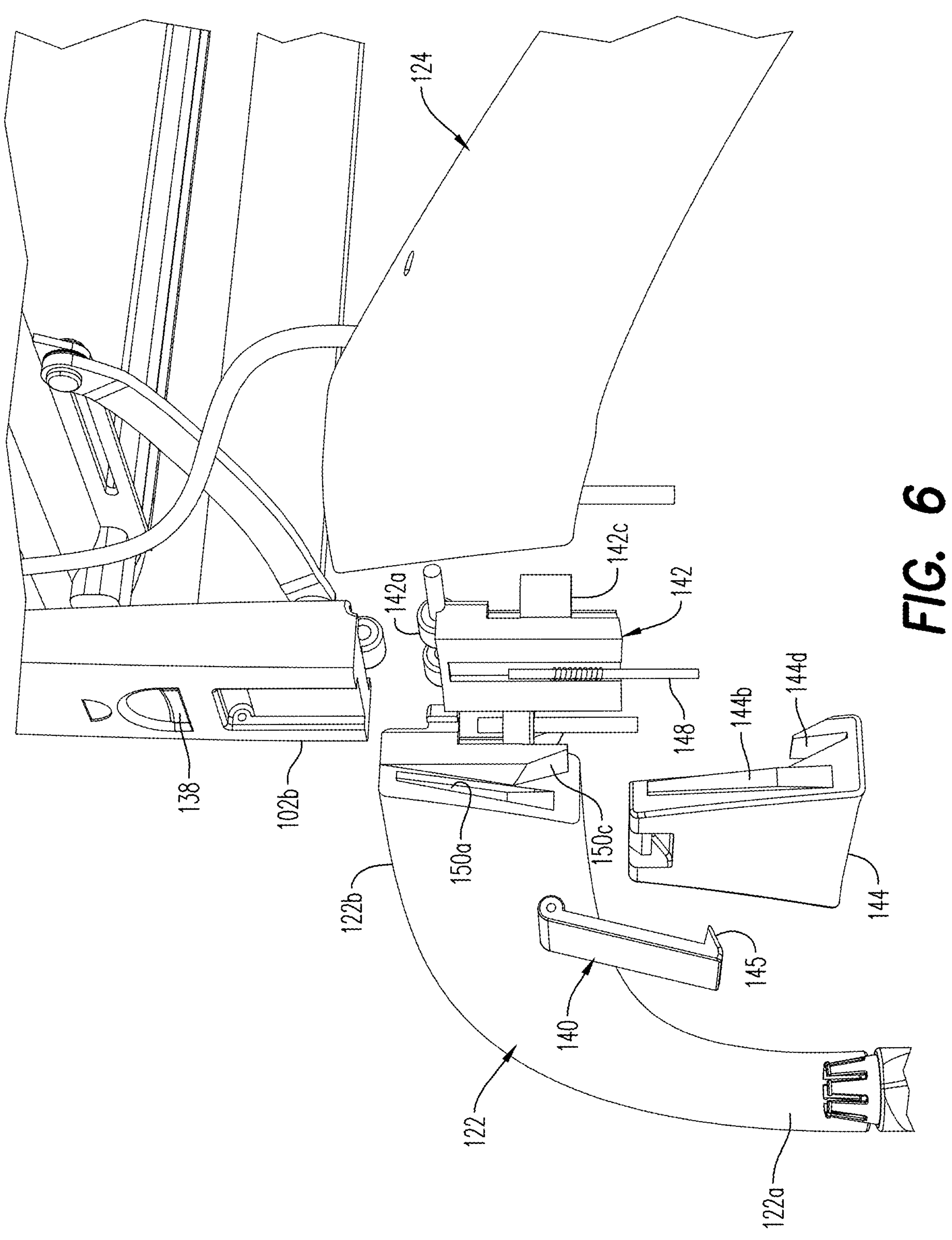
FIG. 6 is another perspective view, with parts separated, of the hinge mechanism of FIG. 5.
Figure 7:
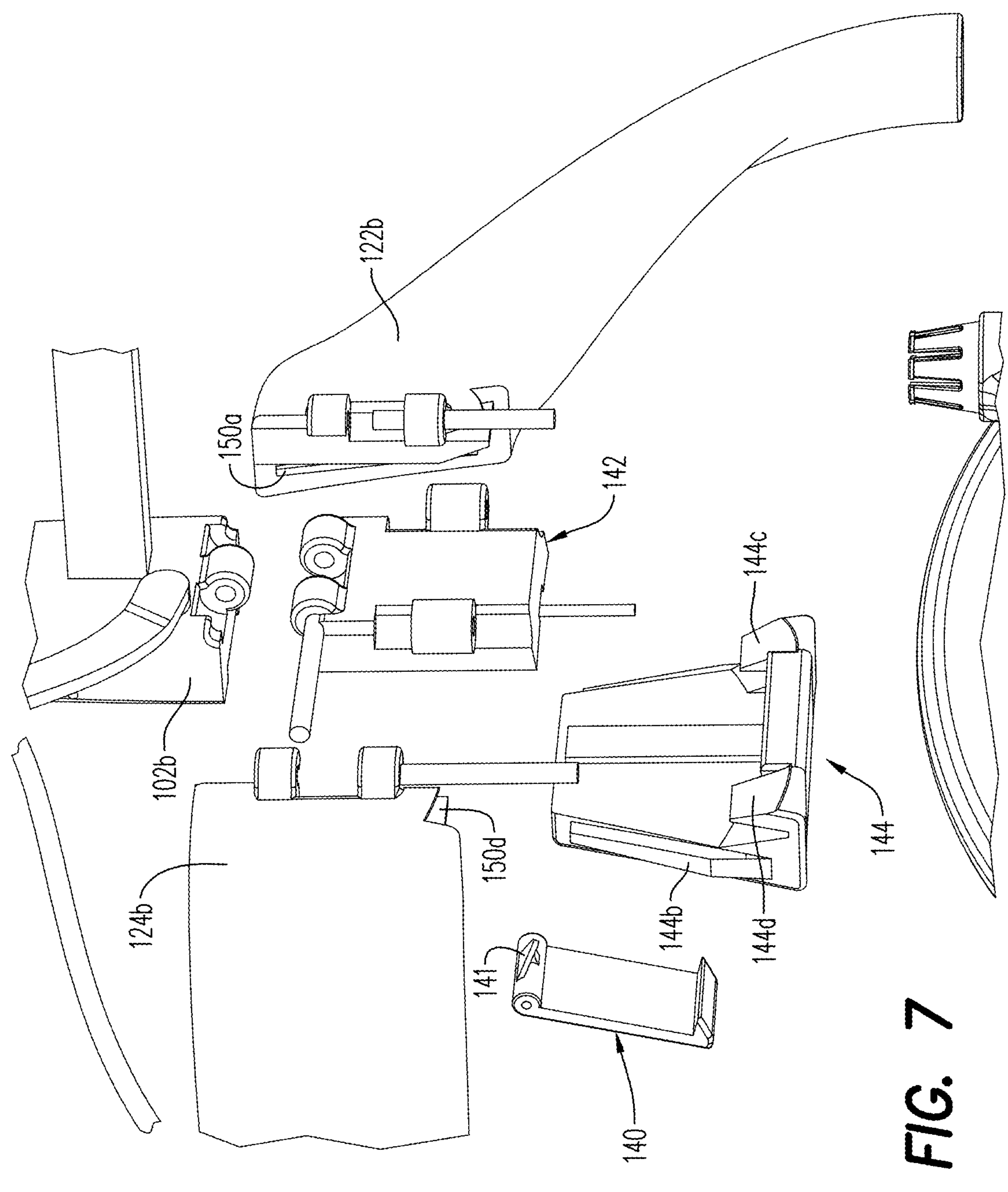
FIG. 7 is yet another perspective view, with parts separated, of the hinge mechanism of FIG. 5.
Figures 9A, 9B:
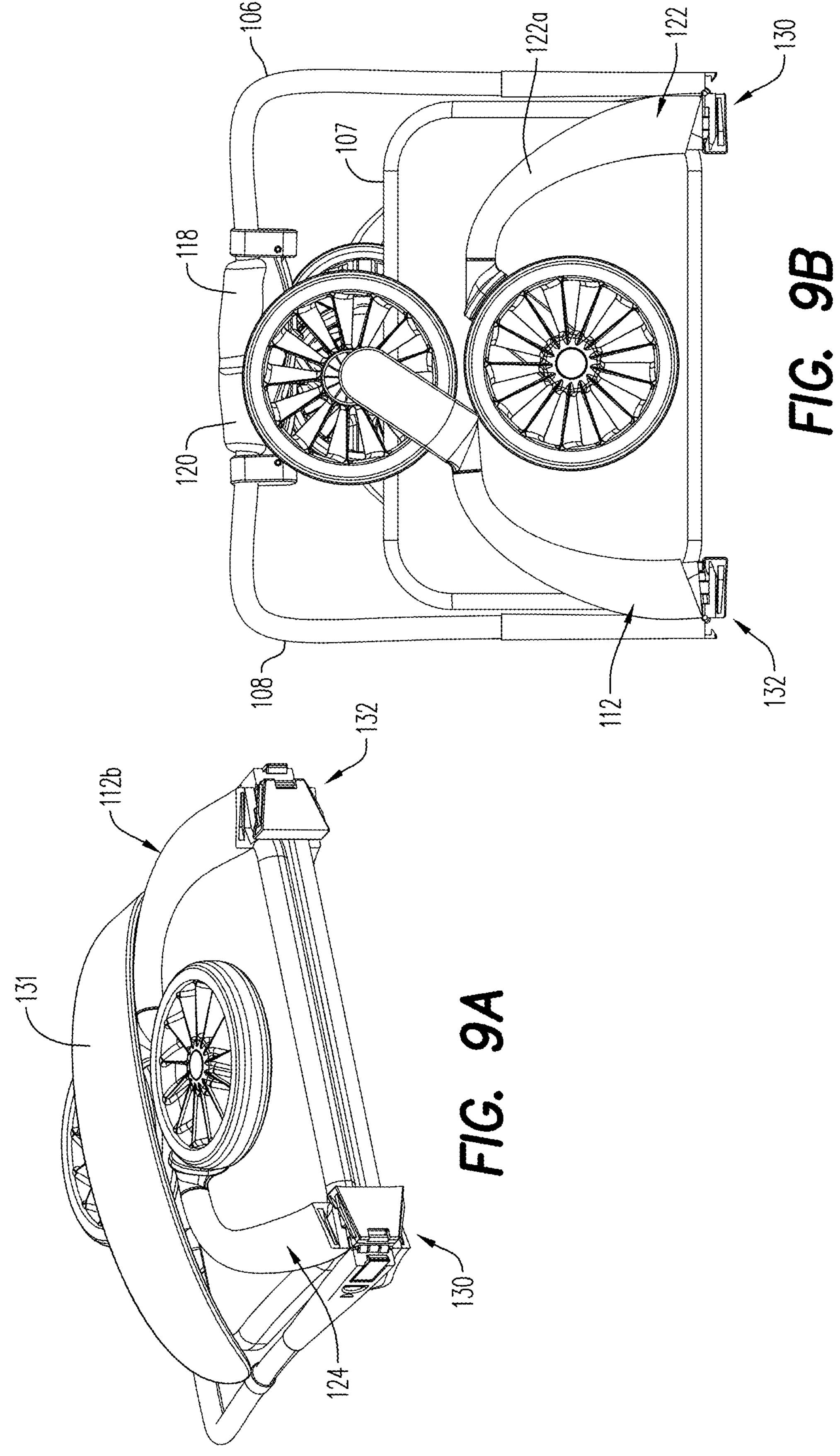
FIG. 9A is a perspective view illustrating the rollator of FIG. 1 in a folded or stored configuration.
FIG. 9B is a plan view illustrating the rollator of FIG. 1 in the folded or stored configuration.

The first and second upright frames 102, 104 may be hollow metal bars having an upper end portion 102*a*, 104*a* and a lower end portion 102*b*, 104*b*. The upper end portions 102*a*, 104*a* may be round in cross-section and configured to slidably and rotatably receive respective first and second shafts or handlebars 106, 108. As shown in FIG. 3, the handlebars 106, 108 may be configured to rotate relative to and about a longitudinal axis of the respective first and second upright frames 102, 104 to transition the handlebars 106, 108 from an in-use configuration (FIGS. 1 and 2) to a folded configuration (FIG. 9B) in which handles 118, 120 of the handlebars 106, 108 are coplanar. In aspects, handles 118, 120 of the handlebars 106, 108 may be adjacent (e.g., abutting) and coaxial with one another when the handlebars 106, 108 are in the folded configuration. In aspects, the handles 118, 120 may have a first function of supporting a user during maneuvering the rollator 100 along a ground surface when the rollator 100 is in the in-use configuration (FIG. 1), and a second function of acting as a handle for carrying the rollator 100 when the rollator 100 is in the folded configuration (FIG. 9B). The handlebars 106, 108 may be slidably received in the upper end 102*a*, 104*a* of the first and second upright frames 102, 104 to allow for a selective adjustment of the height of the handlebars 106, 108 relative to the upright frames 102, 104. A back support 131 may be attached to the handlebars 106, 108 and extend frontwardly therefrom. It is contemplated that the back support 131 may be coupled to other suitable locations of the rollator 100.

With reference to FIGS. 1-4, the seat 107 of the rollator 100 may be pivotably supported between and by the first and second upright frames 102, 104. The seat 107 is coupled at each side thereof to the first and second upright frames 102, 104 by a crossbar 114 (FIG. 4) that extends underneath the seat 107 and spans the width of the seat 107. The seat 107 may include a track 115 that receives a pin of a linkage arm 116 that pivotably couples to the first upright frame 102 such that the seat 107 is configured to pivot relative to the upright frames 102, 104 between an in-use or horizontally-oriented position in which the seat 107 is perpendicular to the first and second upright frames 102, 104 (FIG. 1) and a folded or vertically-oriented position (FIG. 3) in which the seat 107 is coplanar or otherwise parallel with the first and second upright frames 102, 104. In aspects, the seat 107 may be pivotably or slidably coupled to the first and second upright frames 102, 104 via any suitable fastening engagement to allow for folding of the seat 107 between the in-use and folded positions.

With reference to FIGS. 2 and 4-8, the first leg assembly 110 of the rollator 100 is coupled with the bottom end portion 102*b* of the first upright frame 102 by a first hinge mechanism 130 and the second leg assembly 112 is coupled with the bottom end portion 104*b* of the second upright frame 104 by a second hinge mechanism 132. The first leg assembly 110 includes a front leg 122 and a rear leg 124 and the second leg assembly 112 includes a front leg 112*a* and a rear leg 112*b*. Since the first leg assembly 110 is identical or substantially identical in function to the second leg assembly 112 and the first hinge mechanism 130 is identical or substantially identical in function to the second hinge mechanism 132, only details of the first leg assembly 110 and the first hinge mechanism 130 are provided herein.

The front leg 122 of the first leg assembly 110 has a lower end 122*a* and a higher end 122*b*, and the rear leg 124 of the first leg assembly 110 has a lower end 124*a* and a higher end 124*b*. The lower end 122*a* of the front leg 122 supports a front wheel 126 thereon, and the lower end 124*a* of the rear leg 124 supports a rear wheel 128 thereon. In aspects, the front wheel 126 may be rotationally coupled to the front leg 122 via a swivel joint 134 and the rear wheel 128 may be fixedly coupled to the rear leg 124 to prevent swiveling of the rear wheel 128 about an axis perpendicular to the ground. In other aspects, the front wheel 126 may be non-rotationally fixed to the front leg 122 and the rear wheel 128 may be rotationally coupled to the rear leg via the swivel joint 134. In aspects, the lower end 122*a* of the front leg 122 may curve or bend outwardly relative to the higher end 122*b* such that when the first leg assembly 110 is in the folded configuration (FIGS. 9A and 9B), the lower end 122*a* of the front leg 122 may nest with the seat 107 to prevent interference therebetween.

With reference to FIGS. 4-8, the first hinge mechanism 130 enables the first leg assembly 110 (i.e., the front and rear legs 122, 124) to pivot, as a unit, inwardly relative to the first upright frame 110 about a first axis "X1", and the independent pivoting of the front and rear legs 122, 124 about their own second and third axes "X2," "X3" upwardly and toward one another. In aspects, the first axis "X1" may be perpendicular to the second and third axes "X2," "X3."

The hinge mechanism 130 generally includes an actuator 138, a latch 140 in operable engagement with the actuator 138, and a slide lock 144. A hinge plate 142 is provided and, in embodiments, may be considered a component of the first leg assembly 110. The hinge plate 142 has a top side 142*a* that hingedly couples to the first upright frame 102, a front side 142*b* that hingedly couples to the front leg 122, and a rear side 142*c* that hingedly couples to the rear leg 124. As such, the first leg assembly 110 is configured to pivot relative to the first upright frame 102 as a unit with the hinge plate 142, and the front and rear legs 122, 124 are configured to independently pivot rotate relative to the hinge plate 142.

The actuator 138 may be a button slidably supported in the lower end portion 102*b* of the first upright frame 102 and accessible by a user. In other aspects, the actuator 138 may be a lever. The actuator 138 may be resiliently biased toward an unactuated position via a spring. A lock/unlock indicator such as a color wheel 146 may be operably coupled to the actuator 138 such that downward actuation of the actuator 138 causes the color wheel 146, half red with an unlock icon and half green with a lock icon, to rotate showing a red color to the user when unlocked. Conversely the color wheel 146 shows green to the user when all components are correctly locked.

The latch 140 has a first end portion 140*a* pivotably coupled to the first upright frame 102 at a location underneath the actuator 138, and a second end portion 140*b* configured to selectively lock the first leg assembly 110 to the first upright frame 102 to prevent pivoting of the first leg assembly 110 about the first axis "X1." The second end portion 140*b* of the latch 140 may have a hooked feature 145 configured to latch onto a correspondingly shaped recess 147 defined in the slide lock 144 to inhibit rotation of the slide lock 144 when the latch 140 is in the locked configuration.

The slide lock 144 may have a wedge-shape and is slidably supported relative to the hinge plate 142 such that the slide lock 144 is slidable on a vertical axis relative to the hinge plate 142 while remaining attached to the hinge plate 142 and inhibited from any other relative motion. The slide lock 144 may be resiliently biased toward an upper position relative to the hinge plate 142 such that the slide lock 144 automatically returns to the upper position after manually sliding the slide lock 144 downward relative to the hinge plate 142. For example, a return spring (not explicitly shown) may be positioned vertically between corresponding projections of the slide lock 144 and the hinge plate 142 to maintain the slide lock 144 in the upper position.

The slide lock 144 includes a first projection or keyed surface feature 144*a* on a first side thereof and a second projection or keyed surface feature 144*b* on a second side thereof. The first keyed surface feature 144*a* is configured for receipt in a correspondingly-shaped cavity 150*a* defined in the upper end portion 122*b* of the front leg 122, and the second keyed surface feature 144*b* is configured for receipt in a correspondingly-shaped cavity 150*b* (FIG. 8) defined in the upper end portion 124*b* of the rear leg 124 to stabilize and intercouple the front and rear legs 122, 124. The slide lock 144 further includes a pair of hooked or ramped features 144*c*, 144*d* configured for mating engagement with a correspondingly shaped ramped feature 150*c*, 150*d* formed in the respective upper ends 122*b*, 124*b* of the front and rear legs 122, 124. The fastening engagement between the ramped features 144*c*, 144*d* and 150*c*, 150*d* prevents rotation of the front and rear legs 122, 124 relative to the slide lock 144, and therefore the hinge plate 142.

As the front and rear legs 122, 124 are rotated outwardly to return to the unfolded state from the folded state, the ramped features 150*c*, 150*d* of the front and rear legs 122, 124 act on the ramped features 144*c*, 144*d* of the slide lock 144 to drive an upward movement of the slide lock 144 relative to the hinge plate 142. In turn, the ramped features 144*c*, 144*d* of the slide lock 144 re-engage the ramped features 150*c*, 150*d* of the front and rear legs 122, 124 to allow the slide lock 144 to slide upwardly relative to the hinge plate 142 under the bias of the return spring to return to its normal, upper position.

In accordance with another embodiment (not explicitly shown), the hooked feature 145 of the second end portion 140*b* of the latch 140 may directly engage a recess or notch (not shown) defined in the upper end 122*b*, 124*b* of each of the front and rear legs 122, 124 to selectively prevent the front and rear legs 122, 124 from rotating relative to one another.

A pin 148 may be slidably positioned in the lower end 102*b* of the first upright frame member 102 and operably coupled between the actuator 138 and the latch 140. For example, the pin 148 may be directly fixed to the actuator 138 at its upper end and engaged with a projection 141 (FIG. 7) extending from the proximal end portion 140*a* of the latch 140 at a bottom end or middle portion of the pin 148. As such, a downward movement of the pin 148, via a downward movement of the actuator 138, drives a rotation of the distal end portion 140*b* of the latch 140 relative to the proximal end portion 140*a* of the latch 140 to disengage the hooked feature 145 of the latch 140 from the recess 147 of the slide lock 144. The bottom end of the pin 148 may also be operably engaged with an uppermost surface of the slide lock 144. In this way, a downward actuation of the actuator 138 slides the pin 148, which both rotates the latch 140 and drives a downward motion of the slide lock 144 relative to the hinge plate 142 and the front and rear legs 122, 124. In another aspect of the present disclosure, the pin 148 may be directly fixed to the actuator 138 at its upper end and operably engaged with an uppermost surface of the slide lock 144 at its lower end, such that a downward actuation of the actuator 138 slides the pin 148, which drives a downward motion of the slide lock 144 relative to the hinge plate 142 and the front and rear legs 122, 124, whereby the downward force of the slide lock 144 rotates the distal end portion 140*b* of the latch 140 out of engagement with the recess 147 of the slide lock 144.

In operation, to transition the rollator 100 from the operational configuration (FIG. 1) to the folded configuration (FIGS. 8-9B), the seat 107 may be pivoted from the horizontally-oriented position to the vertically-oriented position and the handles 118, 120 may be rotated relative to the first and second upright frames 102, 104 into a parallel orientation with the first and second upright frames 102, 104. The actuator 138 of the hinge mechanism 130 may be pressed, whereby the actuator 138 drives a downward motion of the pin 148, which drives a rotation of the distal end portion 140*b* of the latch 140 relative to the slide lock 144 to disengage the hooked feature 145 of the latch 140 from the recess 147 of the slide lock 144. The bottom end of the pin 148 also engages an uppermost surface of the slide lock 144, whereby the slide lock 144 is driven downward relative to the hinge plate 142.

As the slide lock 144 slides downward relative to the hinge plate 142, the ramped features 144*c*, 144*d* of the slide lock 144 disengage from the ramped features 150*c*, 150*d* of the respective front and rear legs 122, 124 to no longer inhibit relative rotation between the hinge plate 142 and the front and rear legs 122, 124. As such, a single actuation of the actuator 138 unlocks the first leg assembly 110 (e.g., the front and rear legs 122, 124 and the hinge plate 142) from the first upright frame 102 to allow for inward rotation of the first leg assembly 110 as a unit, and unlocks the front and rear legs 122, 124 from the hinge plate 142/slide lock 144 to allow for movement of the front and rear legs 122, 124 relative to one another.

Figure 8:
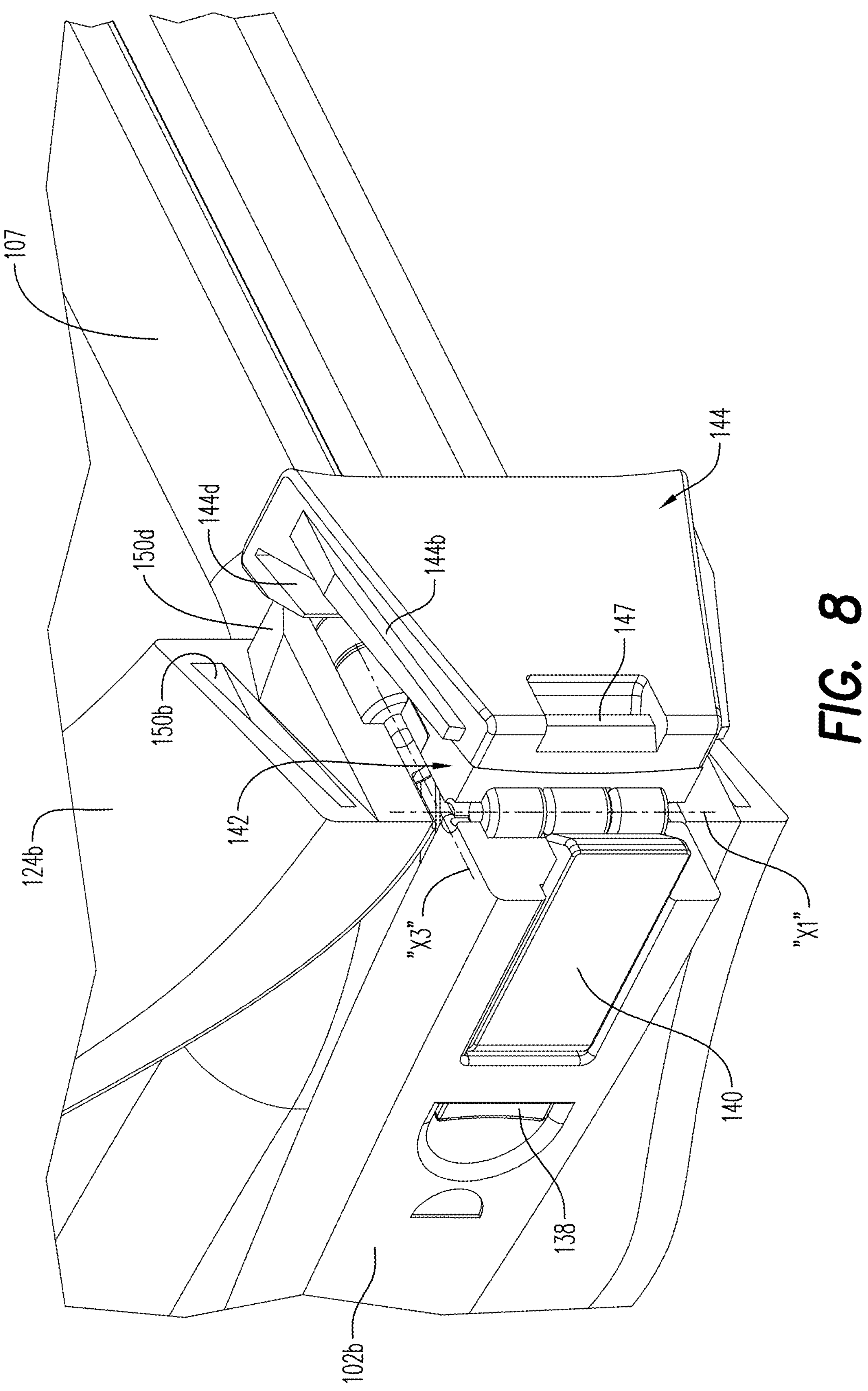
FIG. 8 is an enlarged view showing a first leg assembly of the rollator in a folded configuration.

With the latch 140 no longer locking the hinge plate 142 to the first upright frame 102, the hinge plate 142 together with the front and rear legs 122, 124 may be pivoted inwardly relative to the first upright frame 102 approximately 90 degrees. With the slide lock 144 no longer locking the first and second legs 122, 124 to the hinge plate 142, the front and rear legs 122, 124 of the first leg assembly 110 may be pivoted relative to the hinge plate 142 and toward one another until the front and rear legs 122, 124 are parallel with one another while remaining on opposite side of the seat 107, as shown in FIGS. 8, 9A, and 9B. It is contemplated that the front and rear legs 122, 124 may be rotated relative to one another concurrently, before, or after the first leg assembly 110 (e.g., the front and rear legs 122, 124 and the hinge plate 142) is pivoted inwardly. The same operation may be performed to fold the second leg assembly 112.

With the first and second leg assemblies 110, 112 in the folded state (FIGS. 9A and 9B), the front legs 122, 112*a* of the first and second leg assemblies 110, 112 are positioned on a first side of the seat 107 with the wheels thereof in vertical registration with one another, and the rear legs 124, 112*b* of the first and second leg assemblies 110, 112 are positioned on a second, opposite side of the seat 107 with the wheels thereof in vertical registration with one another. In this way, the rollator 100 assumes a generally square shape with a width of approximately 20-25 inches, a height of approximately 18-23 inches, and a 50-60 percent reduced volume. To unfold or expand the leg assemblies 110, 112 to return to their operational configurations, the reverse operation may be performed.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:

1. A rollator for aiding mobility of a user, the rollator comprising:

- a first upright frame;
- a second upright frame;
- a seat positioned between the first upright frame and the second upright frame;
- a first leg assembly coupled to the first upright frame and including:
  - a front leg supporting a first front wheel; and
  - a rear leg supporting a first rear wheel;
- a second leg assembly coupled to the second upright frame; and
- a hinge mechanism coupled with the first upright frame and the first leg assembly such that the first leg assembly is configured to pivot relative to the first upright frame about a first axis, and at least one of the front leg or the rear leg is configured to pivot about a second axis, wherein the first axis and the second axis are different from one another, wherein the first leg assembly is configured to pivot as a unit about the first axis between a first position, in which the front leg extends forwardly of the first upright frame and the rear leg extends rearwardly of the first upright frame, and a second position, in which the first leg assembly is positioned between the first upright frame and the second upright frame.

2. The rollator according to claim 1, wherein the first axis and the second axis are perpendicular to one another.

3. The rollator according to claim 1, wherein the first leg assembly is configured to pivot as a unit inwardly relative to the first upright frame, and the front leg and the rear leg are configured to rotate toward one another.

4. The rollator according to claim 1, wherein the front leg and the rear leg are configured to pivot relative to one another.

5. The rollator according to claim 1, wherein a single actuation of the hinge mechanism unlocks the first leg assembly from the first upright frame and unlocks the front and rear legs to allow for movement of the front and rear legs relative to one another.

6. The rollator according to claim 1, wherein the second leg assembly includes a front leg and a rear leg, the first and second leg assemblies being configured to transition between an in-use state and a folded state, in which the rear legs of the first and second leg assemblies are positioned on a first side of the seat, and the front legs of the first and second leg assemblies are positioned on a second, opposite side of the seat.

7. The rollator according to claim 6, wherein the seat is configured to move relative to the first and second upright frames between a horizontally-oriented position in which the seat is perpendicular to the first and second upright frames, and a vertically-oriented position in which the seat is parallel with the first and second upright frames.

8. The rollator according to claim 6, wherein the front leg of the second leg assembly supports a second front wheel and the rear leg of the second leg assembly supports a second rear wheel, the first and second front wheels being pivotably attached to the respective front legs by a respective swivel joint.

9. The rollator according to claim 1, further comprising a first handlebar extending from the first upright frame and configured to rotate about a longitudinal axis of the first upright frame.

10. The rollator according to claim 1, wherein the hinge mechanism includes a latch having a first end portion pivotably coupled to the first upright frame, and a second end portion configured to selectively lock the first leg assembly to the first upright frame to prevent pivoting of the first leg assembly about the first axis.

11. The rollator according to claim 10, wherein the hinge mechanism includes an actuator operably coupled to the latch such that an actuation of the actuator rotates the latch from a locking configuration with the first leg assembly and an unlocking configuration with the first leg assembly.

12. The rollator according to claim 10, further comprising a hinge plate pivotably coupled to the first upright frame, each of the front leg and the rear leg is pivotably coupled to the hinge plate such that the first leg assembly is configured to pivot relative to the first upright frame as a unit with the hinge plate and the front and rear legs are configured to pivot relative to the hinge plate.

13. The rollator according to claim 12, wherein the latch is movable between a locked configuration, in which the latch prevents the hinge plate from rotating relative to the first upright frame and prevents the front and rear legs from rotating relative to the hinge plate, and an unlocked configuration in which the hinge plate is free to rotate relative to the first upright frame and the front and rear legs are free to rotate relative to the hinge plate.

14. The rollator according to claim 13, wherein the hinge mechanism defines a recess and the second end portion of the latch has a hooked feature configured for detachable receipt in the recess.

15. A mobility aid, comprising:

a first upright frame;

a second upright frame spaced laterally from the first upright frame;

a seat movably supported between the first upright frame and the second upright frame;

a first leg assembly coupled to the first upright frame and including:

a front leg supporting a first front wheel; and a rear leg supporting a first rear wheel;

a second leg assembly coupled to the second upright frame and including:

a front leg supporting a second front wheel; and a rear leg supporting a second rear wheel;

a first hinge mechanism coupled with the first upright frame and the first leg assembly; and a second hinge mechanism coupled with the second upright frame and the second leg assembly, wherein the front and rear legs of the first leg assembly and the front and rear legs of the second leg assembly are configured to fold, via the first and second hinge assemblies, inwardly toward one another to a position between the first and second upright frames, and the front and rear legs of the first leg assembly and the front and rear legs of the second leg assembly are configured to fold upwardly to a position in which the front legs of the first and second leg assemblies are positioned on a first side of the seat and the rear legs of the first and second leg assemblies are positioned on a second, opposite side of the seat.

16. The mobility aid according to claim 15, wherein the first hinge mechanism includes:

a latch having a first end portion pivotably coupled to the first upright frame, and a second end portion configured to selectively lock the first leg assembly to the first upright frame; and an actuator operably coupled to the latch such that a single actuation of the actuator rotates the latch from a locking configuration with the first leg assembly to an unlocking configuration with the first leg assembly.

17. The mobility aid according to claim 16, further comprising a hinge plate pivotably coupled to the first upright frame, the front and rear legs of the first leg assembly are pivotably coupled to the hinge plate such that the first leg assembly is configured to pivot relative to the first upright frame as a unit with the hinge plate and the front and rear legs are configured to pivot relative to the hinge plate.

18. The mobility aid according to claim 17, wherein the latch is movable between a locked configuration, in which the latch prevents the hinge plate from pivoting relative to the first upright frame and prevents the front and rear legs of the first leg assembly from rotating relative to the hinge plate, and an unlocked configuration in which the hinge plate is free to rotate relative to the first upright frame and the front and rear legs of the first leg assembly are free to rotate relative to the hinge plate.

19. A rollator for aiding mobility of a user, the rollator comprising:

a first upright frame;

a second upright frame;

a seat positioned between the first upright frame and the second upright frame;

a first leg assembly coupled to the first upright frame and including:

a front leg supporting a first front wheel; and a rear leg supporting a first rear wheel;

a second leg assembly coupled to the second upright frame; and a hinge mechanism coupled with the first upright frame and the first leg assembly such that the first leg assembly is configured to pivot as a unit inwardly relative to the first upright frame, and the second leg assembly is configured to pivot as a unit inwardly relative to the second upright frame.

20. The rollator according to claim 19, wherein the front leg and the rear leg of the first leg assembly are configured to rotate toward one another.

* * * * *